United States Patent [19]

Ertle et al.

[11] Patent Number: 5,160,710
[45] Date of Patent: Nov. 3, 1992

[54] APPARATUS FOR CONTINUOUS PRODUCTION OF INTUMESCED PARTICLES

[76] Inventors: Raymond T. Ertle; Raymond J. Ertle, both of 15 Elizabeth Ave., Pompton Plains, N.J. 07444

[21] Appl. No.: 790,671

[22] Filed: Nov. 8, 1991

[51] Int. Cl.[5] .................. B01D 1/00; C01B 15/12; C07C 221/00; B03B 1/00
[52] U.S. Cl. .................. 422/307; 422/285; 423/279; 252/378 R; 252/378 P; 34/171; 209/11; 209/919
[58] Field of Search ............... 422/285, 286, 307, 308, 422/309, 232, 233; 423/279; 252/378 R, 378 P; 266/177, 181, 183, 195; 432/11, 124, 131, 142, 239; 219/388; 34/147, 171, 178, 181; 209/11, 919, 350

[56] References Cited

U.S. PATENT DOCUMENTS

| | | | |
|---|---|---|---|
| 2,139,378 | 12/1938 | Myers et al. | 252/378 R |
| 2,488,115 | 11/1949 | Benos . | |
| 2,550,877 | 5/1951 | Stafford et al. | 252/378 P |
| 2,558,963 | 7/1951 | Klepetko et al. | 266/181 |
| 3,097,832 | 7/1963 | Murdock et al. | 432/58 |
| 3,206,905 | 9/1965 | Wavering et al. | 52/743 |
| 3,728,208 | 4/1973 | Whittington | 428/405 |
| 3,756,839 | 9/1973 | Rao | 106/604 |
| 3,765,919 | 10/1973 | Gelbman | 106/409 |
| 3,882,034 | 5/1975 | Gibbons | 252/99 |
| 3,992,287 | 11/1976 | Rhys | 209/2 |
| 4,031,354 | 6/1977 | D'Souza | 219/389 |
| 4,203,773 | 5/1980 | Temple et al. | 501/85 |
| 4,412,978 | 11/1983 | Ertle | 423/279 |
| 4,503,627 | 3/1985 | Schumacher | 34/173 |

*Primary Examiner*—Robert J. Warden
*Assistant Examiner*—Christopher Y. Kim
*Attorney, Agent, or Firm*—Klauber & Jackson

[57] ABSTRACT

Apparatus for continuous production of intumesced, expanded, puffed, or exfoliated particles. A rotatable processing table is driven by a speed controllable motor connected to rotate the table at a desired rotational rate. Particulate feeding means overlie the table for depositing the particles to be intumesced onto a first sector in the path of the upper surface of the processing table during rotation thereof. Heating means are mounted above and below the plane of the processing table at a second sector in the rotational path of same which is spaced from the first sector, and heat expand the particles during passage through the second sector. A scraper blade is mounted above the processing table at a third sector in the rotational path of the table which is spaced and downstream from the second sector. The bottom of the blade is in sliding contact with the rotating table, the blade being adapted to intercept the expanded particles advancing on the table surface from the second zone and move the particles toward the periphery of the table. A collector is positioned to one side of the processing table and beneath the end of the scraper blade remote from the table axis of rotation, for receiving the expanded particles as same are swept by the blade from the table.

14 Claims, 2 Drawing Sheets

APPARATUS FOR CONTINUOUS PRODUCTION OF INTUMESCED PARTICLES

RELATED DISCLOSURE DOCUMENT

This invention has been the subject of a disclosure document filed at the United States Patent and Trademark Office on Oct. 19, 1990, under Disclosure Document No. 265,193. This Disclosure Document is hereby incorporated by reference.

BACKGROUND OF INVENTION

This invention relates generally to apparatus and methods for producing intumesced or puffed particles and more specifically relates to apparatus useful in the continuous production of intumesced particles as for example intumesced alkaline metal silicates, borax, perlite, vermiculite and the like.

Intumesced or puffed mineral particles having a generally spumiform nature, i.e. being of frothy or foamy characteristics, have found wide applications in numerous fields of commerce and technology. One such type of particles takes the form of a puffed intumesced or expanded alkaline metal silicate, and a number of issued U.S. patents can be cited pertinent to such subject. U.S. Pat. No. 3,756,839 for example, describes the preparation of silicate-based materials which may be intumesced, which are prepared from anhydrous silicates and insoluble powders and water. Other prior art patents relating to expandable silicate particles include U.S. Pat. Nos. 4,203,773; 3,728,208; and 3,765,919. The methods used to convert the intermediate or unpuffed such silicates to the expanded or intumesced form, commonly can include heating. For example, in the aforementioned U.S. Pat. No. 3,728,208, pellets are initially formed from dehydrated sodium silicate which is admixed with liquid sodium silicate, a mineral extender and oleophilic-hydrophobic agent. The pellets in semisolid form are passed through a heating chamber such as a rotary kiln or a microwave oven, where at elevated temperatures in the range of about 250° to 1000° F. the pellets will expand into random shaped foam particles. During this heating process the volume of the pellets increases three to four times. These particular pellets are useful in oil spill control and removal; but expanded silicate particles are more generally useful in many applications, including as insulation, in construction applications, in packaging, and in other fields in which lightweight and chemically relatively inert particles are highly desirable.

Another type of intumesced or puffed particle of interest to the present invention is puffed borax. Reference may be had for background concerning this type of product to the present inventor's U.S. Pat. No. 4,412,978. In the preparation of puffed borax, particulate borax pentahydrate particles are rapidly heated to above the melting temperature of the pentahydrate, whereat the borate dissolves in its own water of hydration and the solution erupts through the partially dehydrated crystal surface resulting in the puffed product. The resultant product thus consists of low density particles or "beads", which have high surface area and include large quantities of voids. By virtue of such structure large quantities of liquids and/or solids can be loaded onto the expanded borax, rendering such products useful among other things as a bulk carrier in numerous applications.

As pointed out in my aforementioned 4,412,978 patent, various techniques have been utilized in the past to effect the desired heating of the borax feed material. U.S. Pat. No. 4,031,354 to D'Souza for example describes a rotary inclined tubular dryer into which granulated borax is fed at its higher end and puffed borax is discharged at the lower end. A countercurrent flow of dry air is maintained in the dryer. Borax is prevented from adhering to the interior of the tube by an adjustable spring-loaded scraper. In this process undesirable clusters or chunks tend to be formed. Other methods for puffing the borax are described in British Patent No. 629,171, and by use of a so-called borax "gun" one type of which is disclosed in U.S. Pat. No. 3,454,537, wherein the borax feed particles are mixed with hot gases in a venturi feed zone. Another approach is described in U.S. Pat. No. 3,822,034 to E. J. Gibbons in which the borax feed is introduced downwardly into an upwardly moving air stream in a spray tower.

In my own U.S. Pat. No. 4,412,978, a particularly advantageous method is used to produce a puffed borax of high strength and other improved characteristics. In the method described, particles of borax are introduced into a downwardly flowing, slowly moving laminar airstream in a vertical tower, as a horizontally dispersed sheet of particles. The air stream is heated sufficiently to remove part of the water of hydration without fusing the borax. The borax particles carried by the airstream are gravitationally separated downstream and are found to have a more uniform puffing ratio.

Another particle type of particular interest to the present invention is exemplified by the mineral vermiculite. Particles of this mineral under the action of heat can be expanded by exfoliation to result in materials useful as heat insulators or for many other purposes. Various apparatus have been described for this purpose, including that set forth in U.S. Pat. No. 2,139,378.

Yet another example of an expandable particulate material is perlite which is a volcanic glass of concentric onion-like structure. A furnace useful in expanding particles of this type is described in U.S. Pat. No. 2,550,877. Also see a further apparatus for such use in U.S. Pat. No. 3,097,832 as well as U.S. Pat. No. 3,206,905.

It will be apparent from the foregoing references that numerous of the prior art apparatus and techniques for expanding intumescent particles employ air as the heat transfer medium. One of the objections to this technique is that with certain types of feed particles (e.g. borates) such medium inherently captures many of the fines which invariably result because a commercially useable feed has a wide particle size distribution (PSD). This use of air as a transfer medium causes these fines to be carried by the air stream and they must be subsequently separated from the airstream and either discarded or added back to the finished product stream. Discarded fines add significantly to the cost of production and decrease yield, and adding them back to the main product stream results in a degradation of the finished product quality since large amount of fines cause dusting problems with subsequent handling and/or compounding.

Indeed, insofar as the production of intumesced particles from a feed having wide PSD is concerned, even processes and apparatus which do not use air as the heat transfer medium, e.g. rotary kilns and the like, do not in most instances remove the fines invariably produced with an airstream.

Regardless of the particular heating media or approach that may be used in the course of preparing the intumesced particles, a crucial concern is one of accurately controlling the degree of heating of the feed particles. The prior art apparatus have not been well adapted for these purposes. For example, while the flow of particulate matter through a spray tower does provide a very gentle environment for the heating action, it is difficult to accurately control the residence times of the particles, due to differences in flow rates across the interior of the tower, as well as due to differences in the particulate size which influences the drag forces on the particles. The range of possible dwell times in such towers is very limited, because the height of the tower is fixed, and accurate control of longer dwell times cannot be achieved by simply changing air flow.

The bulk of other furnace constructions which have heretofore been used for these purposes are similarly devoid of accurate dwell time control for the particles, in that in most instances it will be found that such particles progress through the furnaces in a rather indeterminate manner so that in general it is only the input/output movement from the furnace which progress with regularity, not the movement of individual parts of the particulate mass. It will be appreciated that in order to provide an accurate residence time in the heating portion of the device or furnace, the flow through the heating means must be accurately controlled; and moreover, the feed rate to the heating device must be accurately controlled as well, so that effectively there is a constant flow through the heater of uniform packets of material. These factors have not been adequately considered in the prior art, with the result that there has not to the present time been apparatus available which can meet all of the stated objectives.

In accordance with the foregoing, it may be regarded as an object of the present invention to provide apparatus for continuous production of intumesced particles, which enables accurate and fully repeatable control of the heating of the packets of particles advancing through the apparatus, as well as accurate and complete control in the feed of the particulate matter into the heating portion of the device.

It is a further object of the invention to provide apparatus which will maintain particles stationary in relation to one another during intumescing to allow smaller particles or fines to be taken up by larger particles during the somewhat plastic intumescing stage.

It is a still further object of the present invention to provide apparatus of the aforementioned character which is highly adaptable to use with a variety of particulate materials, therefore rendering it useful in the intumescing or puffing of diverse particles, such as alkaline metal silicates, borates and mineral particles such as perlite, vermiculite and the like.

BRIEF SUMMARY OF THE INVENTION

Now in accordance with the present invention, the foregoing objects and others as will become apparent in the course of the ensuing specification, are achieved in apparatus for continuous production of intumesced particles, which includes a rotatable processing table; a speed controllable motor connected to rotate the table at a desired rotational rate; particulate feeding means overlying the table for depositing the particles to be intumesced onto a first sector in the path of the rotating upper surface of the processing table; a heating means provided at a second sector in the rotational path of the processing table which is spaced from the first sector, for heat expanding the particles during passage through the second sector; particle sweeping means mounted above the processing table at a third sector in the rotational path of the table, which is spaced and downstream from the second sector, the sweeping means being adapted to intercept the expanded particles advancing on the table surface from the second sector and move the particles to the periphery of the table and thence off the table; and a collector means positioned to one side of the processing table for receiving the expanded particles as the latter are removed by the sweeping means from the table.

The particle sweeping means may comprise a mechanical scraper, an air sweep, a vacuum collector, or combination of these devices.

The particle sweeping means preferably may comprise a scraper blade mounted above the processing table, the bottom of the blade being in sliding contact with the rotating table and being adapted to intercept the expanded particles advancing on the table surface from the second sector and move the particles to the periphery of the table and thence off the table. The scraper blade may comprise a curved member which extends from a point proximate the axis of rotation of the table to slightly beyond the periphery of the table. The scraper blade is preferably curved, and more preferably is in the form of a section of a spiral.

The table surface may comprise a metal, ceramic, or refractory plate. The heating means may comprise one or more convection or radiant heaters which are mounted above and/or below the plate at the said second sector. Preferably the table surface is a metal plate, and the heating means comprises a convection heater mounted beneath the plate with a radiant heat reflector or a separate source of radiant heat being mounted above the plate.

In accordance with a further aspect of the invention, the particulate feeding means comprises a hopper for receiving the feed particles; a rotatable feed table; motor means for driving the rotatable feed table at a selected rotational speed; metering means for receiving the particles from the hopper and controllably metering same onto the feed table at a receiving zone; and a particle sweeping means mounted proximate the rotating table downstream of the receiving zone, for intersecting particulate material deposited on the table and moving the material to the periphery of the table and then off the table. Collection and transfer means receive the material from the feed table and deposit it upon the underlying rotatable processing table.

The means for metering the particulate from the hopper preferably comprises an adjustable wire tube which extends between the hopper and the underlying rotating feed table. This wire tube is of telescopic construction and therefore of adjustable length enabling the distance between the outlet of the tube and the underlying processing table to be varied, thereby varying the metering rate of the particulate to the underlying table in accordance with the spacing between the outlet of the wier tube and the table, and with the selected rotational speed of the processing table.

The particle sweeping means can take any of the forms discussed above for the analogous means used with the processing table, and preferably comprises a curved scraper blade as is discussed for use with the processing table.

BRIEF DESCRIPTION OF DRAWINGS

The invention is diagrammatically illustrated by way of example in the drawings appended hereto, in which.

DESCRIPTION OF PREFERRED EMBODIMENT

Figure 1:
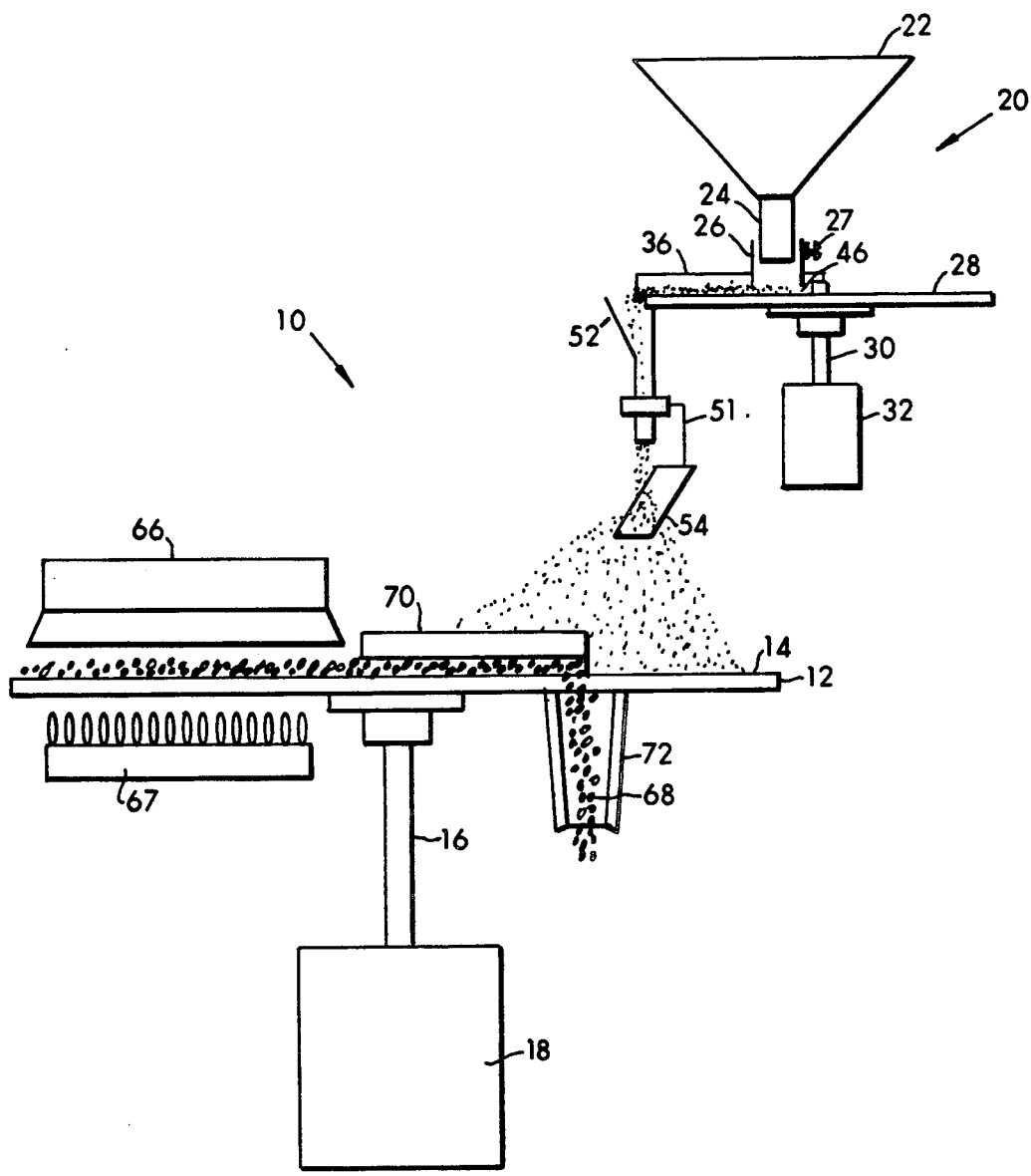
FIG. 1 is an elevational view, schematic in nature, showing apparatus in accordance with the present invention.
Figure 2:
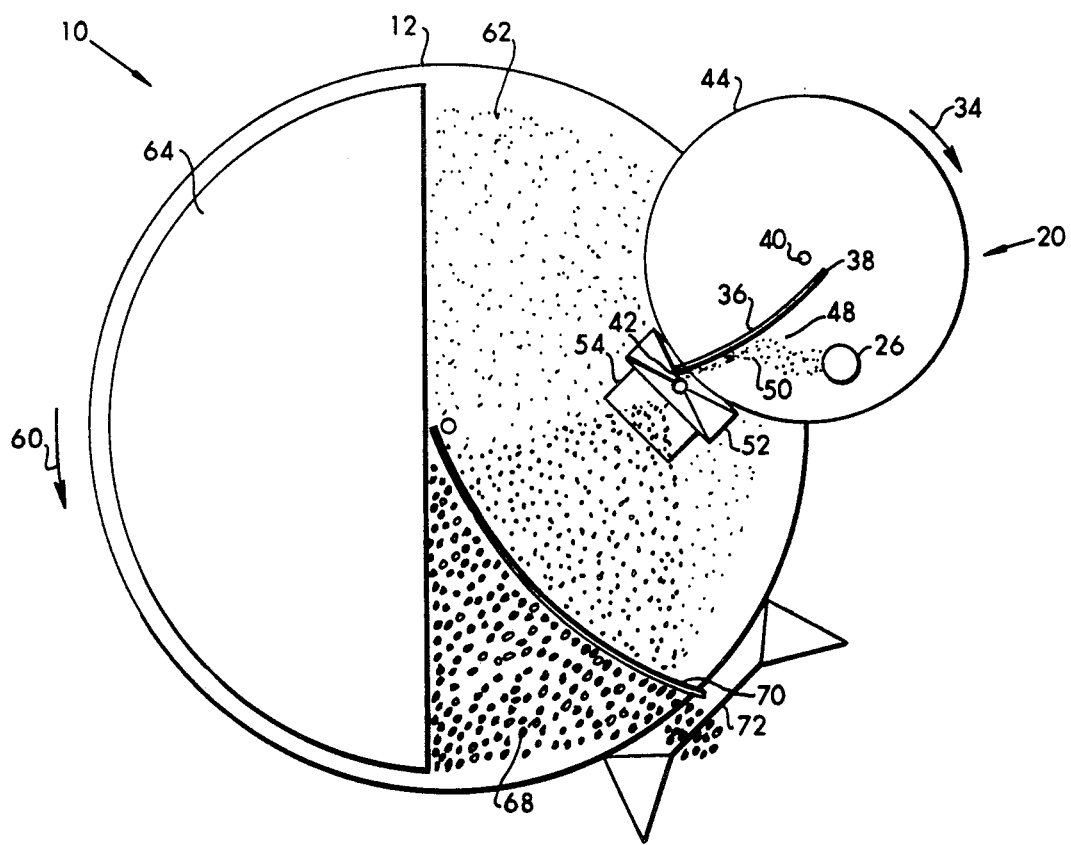
FIG. 2 is a top plan view of the apparatus of FIG. 1.

In FIGS. 1 and 2 herein, schematic, elevational and top plan views appear of apparatus 10 in accordance with the present invention. Such apparatus is adapted for continuous production of intumesced particles. Apparatus 10 is seen to include a rotatable processing table 12 which includes a heat conductive upper surface 14. Processing table 12 can most conveniently comprise a circular metal plate or can be comprised of other materials enabling good heat conductivity for the reasons that will become evident in connection with the present embodiment. Table 12 is mounted for rotation upon a shaft 16 which is driven by a variable speed electric motor 18. The support structure for the present apparatus is not shown but can be conventional in nature. Similarly, motor controls for motor 18 are not shown, but these again are conventional devices, as for example a rheostat control enabling motor 18 to be set to a desired rpm, thereby to selectively control the rotational speed of processing table 12.

Particulate feeding means generally indicated at 20 overlie the processing table 12 and are designed to enable deposit of the particles which are intended to be intumesced onto the upper surface 14 of processing table 12. The feeding means 20 include a fixed hopper 22 for receiving the particulate materials. The outlet end 24 of hopper 22 is fitted with an adjustable wier tube 26. Wier tube 26 surrounds the outlet 24 of hopper 22 in sliding contact therewith. A set screw 27 enables adjustment of the vertical position of wier tube 26. The bottom of the wier tube 26 opens onto a rotatable feed table 28 which can again comprise a circular metal plate or be comprised of other materials as heat conduction is not a central consideration in this feed table 28.

Feed table 28 is again in turn mounted upon a shaft 30 driven by a further variable speed motor 32. It will thus be appreciated that to a considerable extent the particular feeding means 20 bears a general overall resemblance to the larger underlying apparatus to which the particulate matter will be dispensed.

Referring to both FIGS. 1 and 2, it will be seen that feed table 28, which during use rotates in the direction 34, is provided with a curved scraper blade 36 which extends from a point 38 somewhat spaced from the axis 40 of rotation of table 28 to a point 42 slightly beyond the periphery 44 of the table.

The present apparatus is designed to be utilized with intumesceable particulate matter of the type heretofore discussed. For purposes of concretely illustrating the invention, it may be assumed that bulk particles of the expandable alkaline metal silicate type previously discussed have been deposited into the hopper 22. By adjusting the height of the outlet end 46 of the wier tube above the underlying surface of table 28, it will be clear that a certain spacing will be thereby provided; and that accordingly as the feed table rotates in the direction 34 to continually displace the released material from the outlet end of the wier tube, material will be dispensed at a precise metered rate in accordance with the spacing between the wier tube outlet and the underlying table. In FIG. 2, the hopper 22 has been removed for purposes of clarity, and it may be seen that as the particulate matter 48 is thus dispensed, it proceeds to move in the direction of scraper blade 36. The form of the scraper blade is preferably that of a section of a spiral. Accordingly it will be clear that the said material will move outwardly along the scraper blade as shown at 50, and in due course will be deposited into the collection funnel 52 and at a uniform rate depending on the wier tube position and the rate of advance of the table 28. The carefully metered particles thereupon strike an adjustable dispenser plate 54 and thence are deposited onto the upper surface 14 of the processing table 12. Both the vertical and the axial orientation (about support 51) of plate 54 are adjustable to vary the trajectory of the metered particles to achieve good uniformity of particle placement on table surface 14. During normal operation, the metering rate is adjusted via table rotational speed—the wier tube adjustment is used only to adjust the upper limit of the feeder range.

The processing table 12 is rotated in direction 60 at the preselected rate. The particulate material, as a result of the action aforementioned, is deposited initially at a first sector 62 on the upper surface 14 of processing table 12 and thereupon moves into and through a second sector 64 in the rotational path of table 12, which sector comprises a heating station. More specifically, as seen in FIG. 1, a convection heater 67, which can be a simple electrical heater or of other types such as steam, underlies the heat conductive table to heat the bottom surface of same. Overlying the same sector, or heating station, is an infrared heater 66 which can be of electric or other nature and which radiates heat downwardly onto the particulate material and table.

It will be apparent that the dwell time of the particulate material in the heating sector will be very precisely controlled by the rotational speed of the processing table 12 and since the source of heat above and below the table are readily and accurately controlled, the degree of heating of the material which is spread upon the table can and is highly controlled to achieve a desired degree of intumescing.

It will also be apparent that the particles of material passing through the heating sector will be fixed or stationary in relationship to each other, and if in intimate contact during the somewhat plastic intumescing stage, the potential for fines present in the feed to attach to larger particles exits.

Upon leaving the heating sector 64, the now intumesced material 68 enters a third sector in the rotational path of the processing table 12 where it comes in contact with a scraper blade 70 which, except for being on a larger scale, is similar or identical in shape and function to scraper blade 36 previously described. The said scraper blade acts in exactly the fashion which has been described for scraper blade 36, i.e. it is seen that as the intumesced or puffed particles impinge upon the curved facing portion of same, they are moved along the spiral shape and delivered to a discharge chute 72 from which they are collected for use and/or storage and shipment.

While the present invention has been particularly described in terms of specific embodiments thereof, it will be understood in view of instant teaching that numerous variations upon the invention are now enabled to those skilled in the art which variations yet reside in the scope of the present invention. Accordingly, the invention is to be broadly construed and limited only by the scope and spirit of the claims now appended hereto.

What is claimed is:

1. Apparatus for continuous production of puffed, expanded, intumesced or exfoliated particles, comprising in combination:
   (a) a rotatable processing table;
   (b) a speed controllable motor connected to rotate said table at a desired rotational rate;
   (c) particulate feeding means overlying said table for depositing the particles to be intumesced onto a first sector in the rotational path of the upper surface of said processing table during rotation thereof;
   (d) heating means provided at a second sector in said rotational path which is spaced from the said first sector, for heat expanding said particles during passage through said second sector;
   (e) particle sweeping means mounted above said processing table at a third sector in the rotational path of said table surface which is spaced and downstream from the second sector, said sweeping means being adapted to intercept the expanded particles advancing on said table surface from said second zone and move said particles to the periphery of said table and thence off the table; and
   (f) a collector means positioned to one side of said processing table and beneath the end of said sweeping means remote from the table axis of rotation, for receiving the expanded particles as same are moved by said sweeping means from said table.

2. Apparatus in accordance with claim 1, wherein said sweeping means comprises a scraper blade, the bottom of which is in sliding contact with said rotating processing table.

3. Apparatus in accordance with claim 2, wherein said scraper blade comprises a curved member extending from a point proximate the axis of rotation of said table to a point beyond the periphery of said table.

4. Apparatus in accordance with claim 3, wherein said scraper blade is outwardly curved toward its side on which said particles impinge.

5. Apparatus in accordance with claim 4, wherein the form of said scraper blade is a section of a spiral.

6. Apparatus in accordance with claim 1, wherein said table surface comprises a metal plate and wherein said heating means comprises a convection heater mounted beneath said plate and a source of radiant heat mounted above said plate.

7. Apparatus in accordance with claim 1, wherein said table surface comprises a metal plate, and said heating means comprises a convection heater mounted beneath said plate and a radiant heat reflector mounted above said plate.

8. Apparatus in accordance with claim 1, wherein said particulate feeding means comprises a hopper for receiving said particles; a rotatable feed table; motor means for driving said rotatable feed table at a selected rotational speed; metering means for receiving the particles from said hopper and controllably metering same onto said feed table; a particle sweeping means mounted proximate the rotating table at a sector downstream in the direction of table movement, from the point of metering, for intersecting particulate material deposited on said table and moving said material to the periphery of said table and thence off the table; whereby the deposited material upon reaching said sweeping means is advanced to the periphery of said plate and thence pushed off the table; and collection and transfer means for receiving the material from the said table and depositing it upon the underlying rotatable processing table.

9. Apparatus in accordance with claim 8, wherein the means for metering the particulate from said hopper comprises an adjustable wier tube extending between said hopper and the underlying rotating processing table.

10. Apparatus in accordance with claim 9, wherein said wier tube is of adjustable length, enabling the distance between the outlet of said tube and the underlying processing table to be varied, and thereby vary the metering rate of the particulate to said table in accordance with the spacing between the outlet end of said tube and said table, and with the selected rotational speed of said processing table.

11. Apparatus in accordance with claim 8, wherein said particle sweeping means comprises a sweeper blade, the bottom of which is in sliding contact with said rotating feed table.

12. Apparatus in accordance with claim 11, wherein said scraper blade comprises a curved member extending from a point proximate the axis of rotation of said feed table to a point beyond the periphery of said table.

13. Apparatus in accordance with claim 12, wherein said scraper blade is outwardly curved toward its side on which said particles impinge.

14. Apparatus in accordance with claim 13, wherein the form of said scraper blade is a section of a spiral.

* * * * *

UNITED STATES PATENT AND TRADEMARK OFFICE
CERTIFICATE OF CORRECTION

PATENT NO. : 5,160,710
DATED : November 3, 1992
INVENTOR(S) : Raymond T. Ertle, et. al.

It is certified that error appears in the above-indentified patent and that said Letters Patent is hereby corrected as shown below:

At column 4, line 54, change "adjustable wire tube" to "adjustable wier tube".

At column 4, line 56, change "wire tube" to "wier tube".

Signed and Sealed this

Nineteenth Day of October, 1993

Attest:

BRUCE LEHMAN

*Attesting Officer*  *Commissioner of Patents and Trademarks*